Aug. 1, 1967 W. V. CHUMAKOV 3,334,289
CASCADED VOLTAGE BALANCING CIRCUIT
Filed April 20, 1965
5 Sheets-Sheet 1
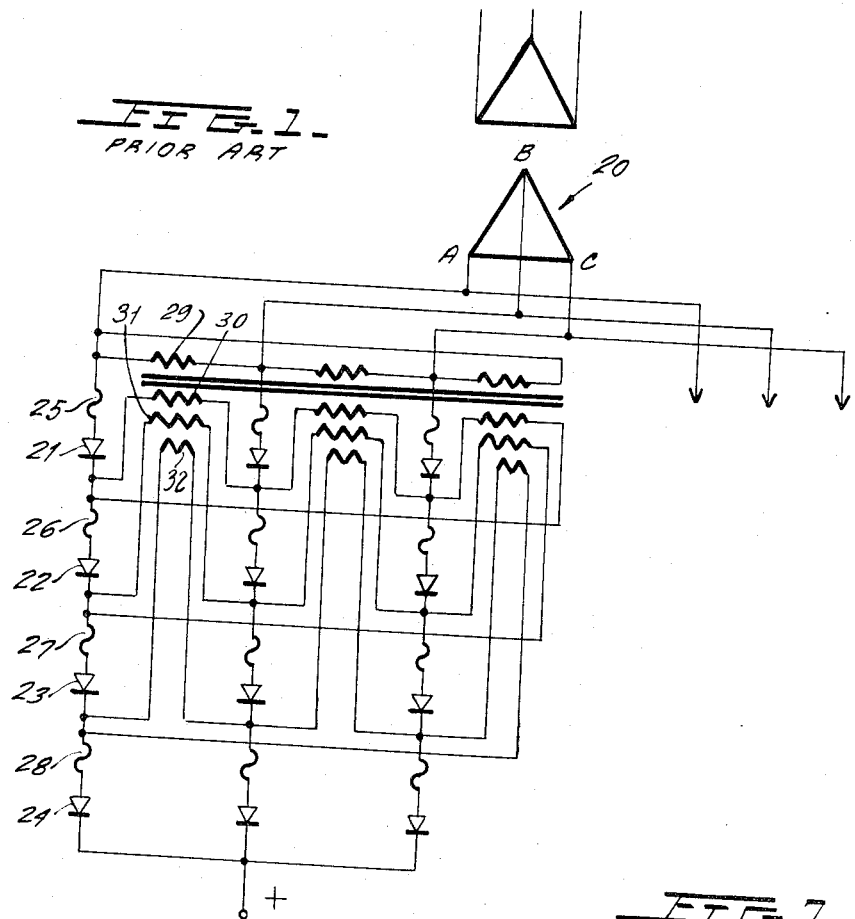
FIG. 1.
PRIOR ART
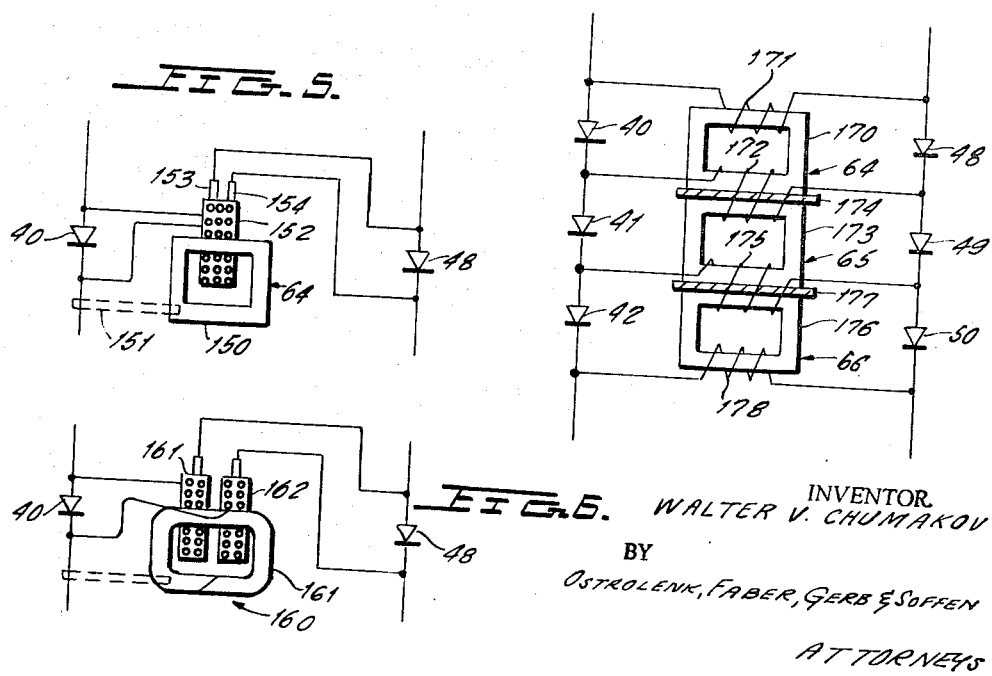
FIG. 5.
FIG. 7.
FIG. 6.
INVENTOR.
WALTER V. CHUMAKOV
BY
OSTROLENK, FABER, GERB & SOFFEN
ATTORNEYS Aug. 1, 1967  W. V. CHUMAKOV  3,334,289
CASCADED VOLTAGE BALANCING CIRCUIT
Filed April 20, 1965

INVENTOR.
WALTER V. CHUMAKOV
BY
OSTROLENK, FABER, GERB & SOFFEN
ATTORNEYS

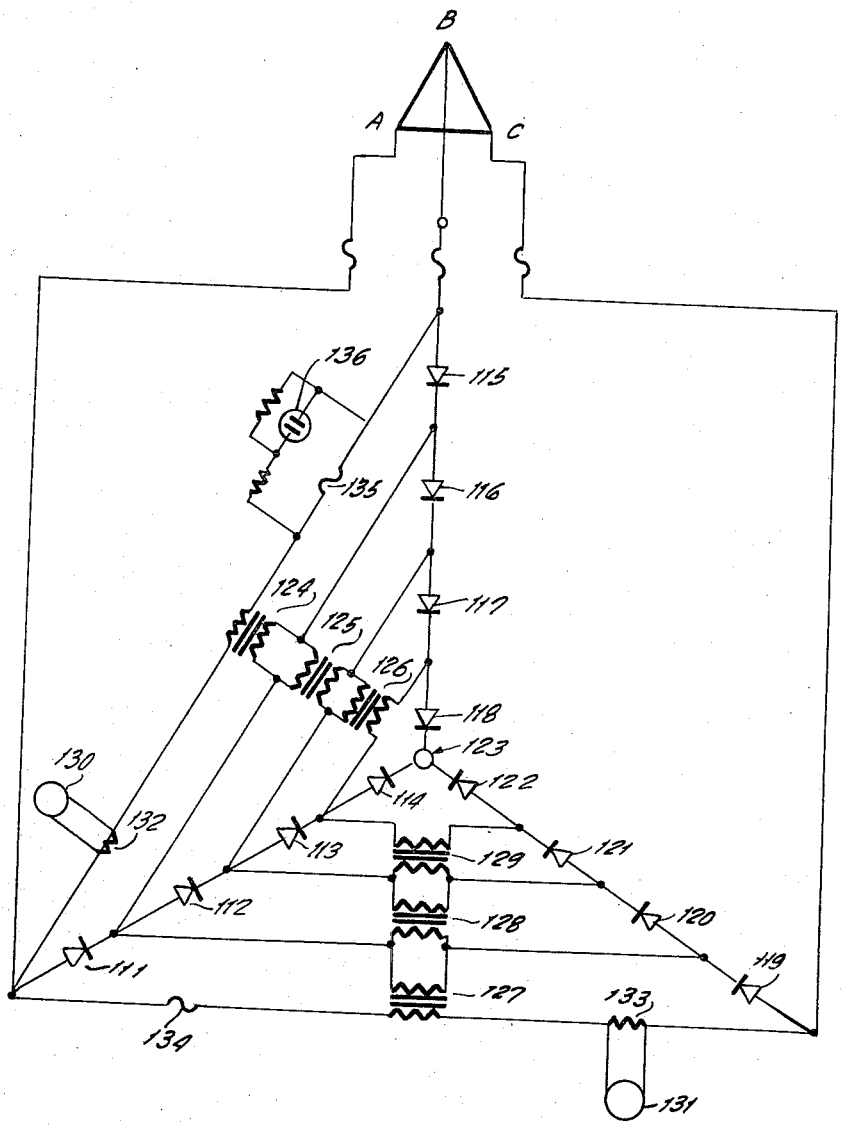

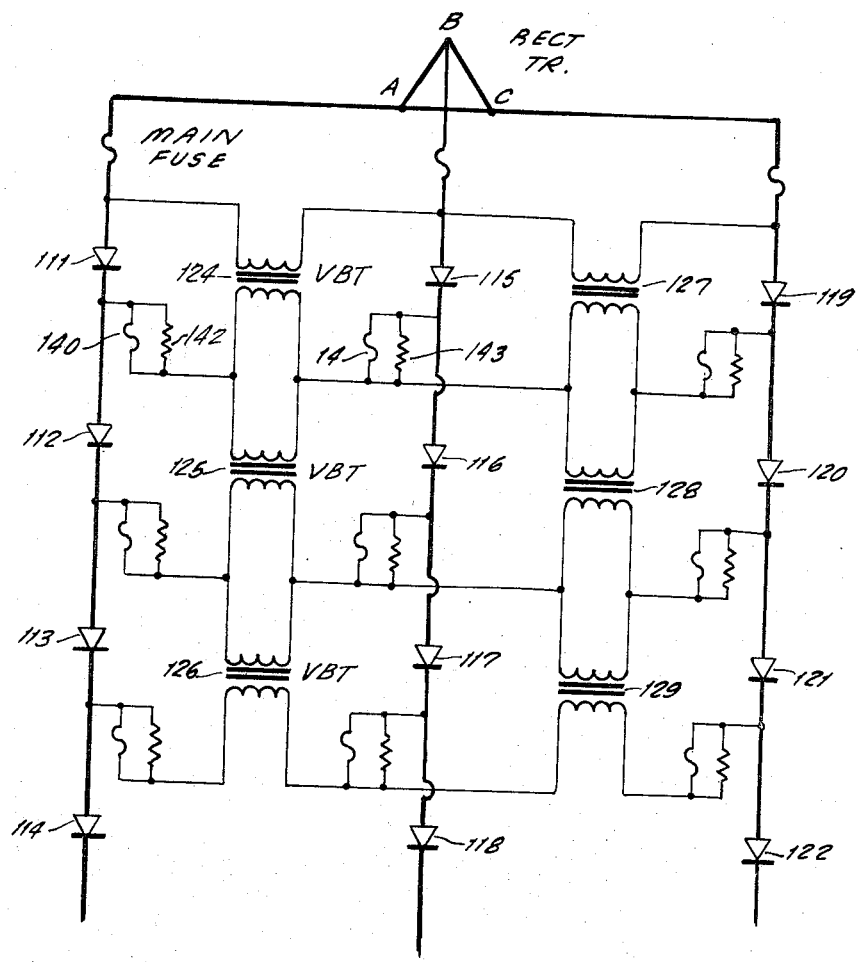

United States Patent Office 3,334,289
Patented Aug. 1, 1967

3,334,289
CASCADED VOLTAGE BALANCING CIRCUIT
Walter V. Chumakov, Philadelphia, Pa., assignor to I-T-E Circuit Breaker Company, Philadelphia, Pa., a corporation of Pennsylvania
Filed Apr. 20, 1965, Ser. No. 449,398
7 Claims. (Cl. 321—11)

This invention relates to rectifier or thyristor circuits, and more particularly to a novel voltage balancing circuit for balancing the voltage across a plurality of series connected rectifier-type devices.

The problem of voltage balancing between series connected rectifier-type devices is fully discussed in U.S. Patent 2,895,099.

The present invention is for an improvement of the voltage balancing type arrangement of this patent, and permits a better division of voltage at very low loss along with a simplified construction for the transformers used. In general, and due to the low reverse or leakage current of semiconductor-type rectifiers and due to the variations in their characteristics, forced inverse voltage balancing is of great importance. The problem of balancing is accentuated in very high voltage rectifier units having a very large number of cells connected in series and in parallel. In such very high voltage units, a parallel resistor and capacitor is commonly provided for each of the individual diodes. This arrangement, however, leads to increased losses in the units and hence to lower efficiency.

While the voltage balancing transformer arrangements shown in U.S. Patent 2,895,099 permits improved voltage division and lower losses than the resistor-capacitor arrangement, the construction of the transformer becomes quite complex and expensive.

Generally, the voltage balancing transformer of the prior art has a primary winding connected to the highest voltage end with respect to the D-C bus within the rectifier and a plurality of secondary windings connected to the diode junction points down to the lowest inverse voltage end closest to the D-C output bus. This same transformer must also furnish the power to blow the fuses connected in series with the individual cells in case of diode failures. Individual fusing, of course, is used only where a number of diodes are connected in parallel within the series connected string to obtain the desired current rating of the installation.

In very high voltage units, this fusing may cost far more than the diodes, and is less important in view of the smaller increase of inverse voltage across remaining cells after one fails. For example, if an installation has ten series connected cells, a single break-down would result in approximately an 11% increase in blocking voltage across the remaining diodes. Where the diodes have been sufficiently over-rated, this can be easily tolerated.

A serious disadvantage with the prior art balancing transformer is that it must be very large since its insulation must be in the same class as the main rectifier transformer. Thus, the primary winding of the balancing transformer must be designed for the full phase-to-phase voltage of the rectifier transformer and, in addition, the large plurality of secondary windings must be properly insulated from one another, since full phase-to-phase voltage will appear between the primary winding and the lowest voltage secondary winding.

In accordance with the present invention, the voltage balancing transformer is broken into a plurality of single phase transformers, each of which furnishes balancing reverse current to one or more respective diodes and also serves to energize the primary winding of the next single phase transformer.

This novel arrangement then provides a completely cascaded balancing scheme having many advantages over that of the prior art balancing transformers. A major advantage of the novel invention is that since the normal reverse current required for balancing is low, the individual transformers require less copper and can be made much smaller. Thus, they may be mounted or supported directly by the buses at the junction between diodes.

Furthermore, only the start of the primary or secondary winding of each transformer has to be insulated for phase voltage against the finish of the same winding. Thus, the primary-to-secondary winding insulation is appreciably reduced and need be sufficient only for the inverse voltage rating of a single diode which would be of the order of 600 or 1,000 volts.

Moreover, and while the prior art technique requires three groups of transformers for a three-phase system, it is possible with the present invention to use only two groups of transformers for a three-phase system. Moreover, the present invention permits the use of standardization techniques since all transformers will have the same ratio. Furthermore, the transformers lend themselves to simplified construction and can, for example, use C-type split cores and windings wound on separate bobbins. Moreover, bifilar or coaxial winding techniques may be used to obtain a lower impedance which is relatively simple in the case of a two-winding transformer than in the case of a transformer having a large plurality of windings on a common core.

Accordingly, a primary object of this invention is to provide a novel voltage balancing circuit for balancing the voltage between a plurality of series connected rectifier-type devices.

Another object of this invention is to simplify the construction of a voltage balancing transformer.

Another object of this invention is to provide a simple, economical transformer construction using simple two-winding transformers for balancing the voltage between a plurality of series connected diodes.

Another object of this invention is to provide a novel, dual-function, single phase transformer for voltage balancing use in rectifier circuits wherein the transformer serves the purpose of providing reverse current for a respective diode or group of diodes, as well as providing the primary voltage for the next transformer in the series.

These and other objects of this invention will become apparent from the following description when taken in connection with the drawings, in which:

FIGURE 1 shows the prior art type of voltage balancing transformer applied to a rectifier circuit.

Figure 2:
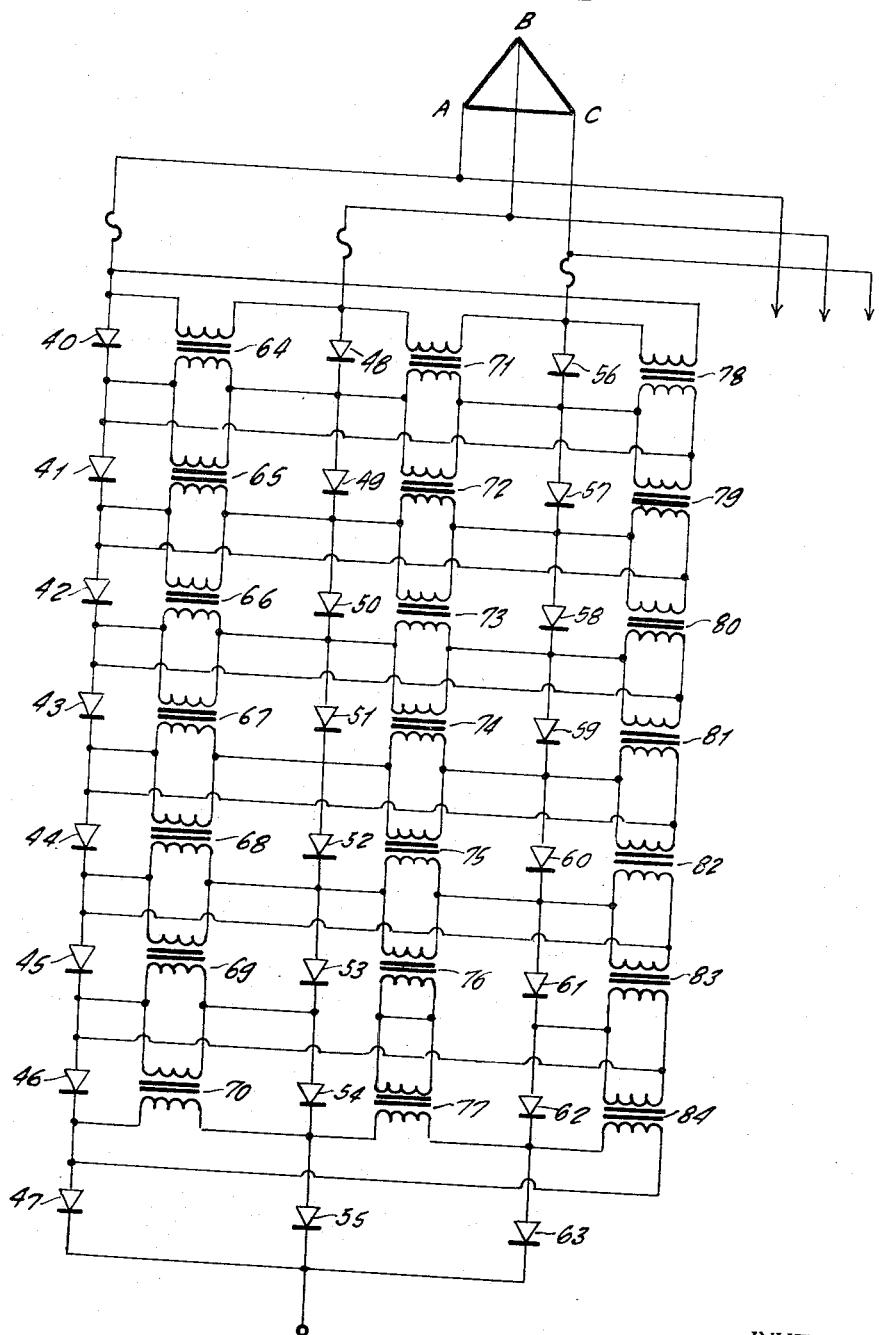
FIGURE 2 is a circuit diagram of the voltage balancing transformer arrangement of the present invention.
Figure 2A:
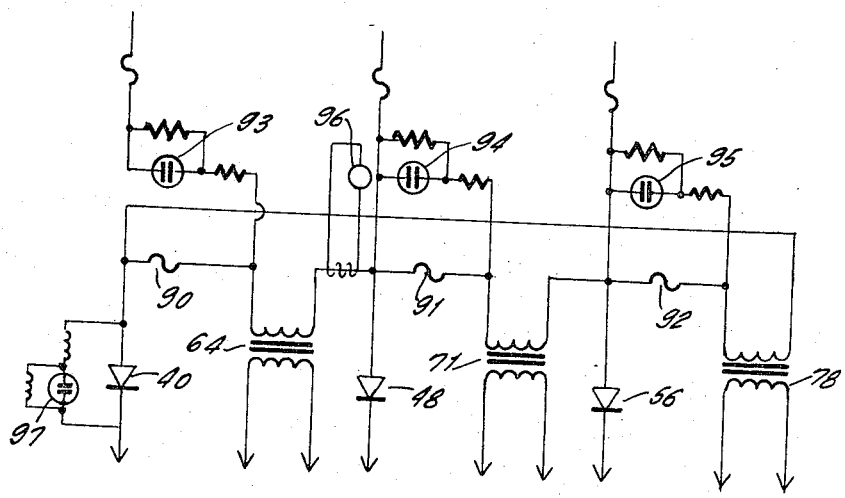

FIGURE 2a schematically illustrates the manner in which failure indicating means can be connected to the fuses and diodes of the circuit of FIGURE 2.

Figure 2B:
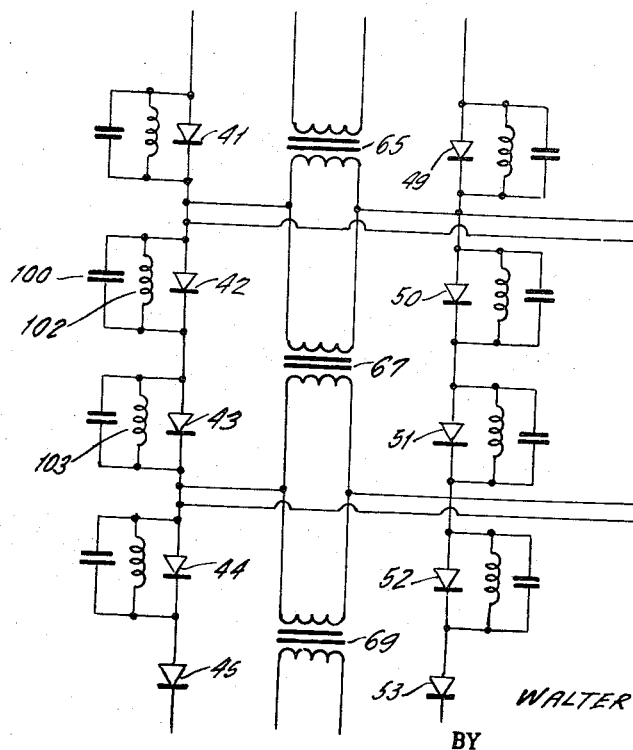

FIGURE 2b illustrates the manner in which the circuit of FIGURE 2 may be modified whereby groups of series connected diodes are balanced by the novel single phase transformer balancing means of the invention, while the diodes within each of the groups are provided with conventional resistance-capacitance type balancing.

FIGURE 3 illustrates the manner in which the voltage balancing scheme of the present invention can be provided with only two sets of voltage balancing transformers for a three-phase circuit.

FIGURE 4 is similar to FIGURE 3 for the case of a modified open delta connection.

FIGURE 5 schematically illustrates one manner in which the novel transformer of the invention can be constructed.

FIGURE 6 shows a second embodiment of the construction of the transformer of the invention.

FIGURE 7 is a still further embodiment showing the construction of the transformer.

Referring first to FIGURE 1, I have illustrated therein the prior art type of voltage balancing system for a rectifier system including a rectifier transformer 20 which may have a bridge-connected rectifier system connected thereto. Only one side of the bridge-connected rectifier is shown in FIGURE 1, it being apparent that the other side will be completed in the identical manner to that shown. The rectifier side shown includes three-phases, each of which have four series connected diodes such as the diodes 21, 22, 23 and 24 for phase A. Each of diodes 21 through 24 are connected in series with respect to fuses 25 through 28, respectively.

In order to appropriately balance the reverse voltage on the diodes 21 through 24, and as is disclosed in U.S. Patent 2,895,099, a three-phase voltage balancing transformer is provided which has a primary winding 29 and a plurality of secondary windings 30, 31 and 32, each wound on a common core. The winding 30 is then connected at the junction between diodes 21 and 22. Winding 31 is connected to the junction between diodes 22 and 23, and winding 32 is connected to the junction between diodes 23 and 24.

Each of secondary windings 30, 31 and 32 are rated in such a manner that the voltage difference in a reverse direction across any diode is rigidly fixed to some predetermined value. That is to say, the voltage appearing across diode 23, for example, is the difference in voltage between the left-hand terminals of windings 31 and 32. Accordingly, voltage balance between the series connected diodes 21 through 24 is rigidly enforced.

As pointed out above, however, the construction of the transformer having windings 29 through 32 is relatively complex and expensive. Moreover, where a large number of series connected diodes are involved, the large number of secondary windings needed makes the transformer structure even more complex.

In accordance with the invention, and as shown in FIGURE 2, the single multi-winding transformer of FIGURE 1 is replaced by a plurality of single phase transformers. Referring now to FIGURE 2, I have illustrated therein the rectifier transformer 20 which may be connected to a bridge-connected circuit, only the left-hand side of which is shown. Clearly, the right-hand side of the circuit will be identical to that shown on the left-hand side in FIGURE 2.

Each of the phases of FIGURE 2 are then provided with a large number of series connected rectifiers. For example, phase A has eight series connected rectifiers 40 through 47. Similarly, phase B has the eight series connected rectifiers 48 through 54, and phase C has the eight series connected rectifiers 56 through 63.

In order to balance the voltage across these rectifiers, and in accordance with the invention, a plurality of simple two-winding transformers are provided. Thus, phase A is provided with seven two-winding transformers 64 through 70; phase B is provided with seven two-winding transformers 71 through 77; while phase C is provided with seven two-winding transformers 78 through 84. One winding of each of the transformers is then connected directly between the junction of two series connected rectifiers and serves to supply reverse current to force the appearance of a balancing voltage across that diode. In addition, the upper transformer serves as a source for the lower transformer. By way of example, transformer 64 has its bottom winding connected between the junction of diodes 40 and 41 and diodes 48 and 49. It is also connected to the upper or primary winding of transformer 65 whose secondary winding is connected between the junction of diodes 41 and 42 and diodes 49 and 50. The transformers progress downwardly in this fashion with each upper transformer serving as the source for the next lower transformer.

With this novel arrangement, it will be apparent that each of the transformers 64 through 84 may be of any standard type which is relatively inexpensive.

FIGURE 2a illlustrates a modification of the circuit of FIGURE 2 wherein the upper windings of the transformers are provided with protective fuse circuits. Thus, in FIGURE 2a, the upper windings of transformers 64, 71 and 78 are connected in series with fuses 90, 91 and 92, respectively.

In order to indicate that the fuses have been operated, neon lamps such as neon lamps 93, 94 and 95 having associated resistors may be connected in parallel with fuses 90 through 92, respectively. Alternatively, a current-sensitive relay such as current-sensitive relay 96 could be provided for each of transformers 64, 71 and 78, as indicated for the case of transformer 64.

In addition, it is also possible to provide failure indicators for each of the diodes, as shown in FIGURE 2a for the case of diode 40. Thus, a neon lamp 97, along with its associated resistors, may be connected in parallel with diode 40; a similar arrangement being provided for each of the diodes.

While FIGURE 2 has illustrated the use of a single phase transformer for each individual diode, it should be noted, and as illustrated in FIGURE 2b, that single phase transformers can be provided for groups of series connected diodes. Thus, in the modification of FIGURE 2b, the transformer 67 will provide reverse current for the series connected group of diodes 42 and 43. Similarly, the single phase transformer 69 will provide reverse current for the group of diodes 44 and 45.

In order to provide balancing within each of the groups, a typical resistance-capacitance circuit could be used. Thus, the diodes 42 and 43 are provided with parallel connected capacitors 100 and 101, respectively, and resistors 102 and 103, respectively. Clearly, the groups can be sub-divided into any number of desired diodes; two diodes being selected in FIGURE 2b for purposes of illustration only.

FIGURE 3 illustrates another embodiment of the invention for the case of an open delta connection of the transformers. Thus, in FIGURE 3, a rectifier transformer is provided with a rectifier bridge only one-half of which is shown in FIGURE 3. This bridge includes the arms having the four series connected diodes 111 through 114 for phase A; 115 through 118 for phase B; and 119 through 122 for phase C. Each of the arms are then connected to the common positive D-C bus 123.

In accordance with the embodiment of FIGURE 3, single phase voltage balancing transformers are required only in two sets. Thus, a first set of transformers 124, 125 and 126 are provided for the arms of phases A and B, as shown, while single phase voltage balancing transformers 127, 128 and 129 are provided within arms A and C.

Two over-current relays 130 and 131 connected to current transformers 132 and 133, respectively, may be provided to monitor the operation of the voltage balancing transformers. If desired, fuse means such as fuses 134 and 135 may also be provided, as illustrated, with monitoring means including a neon lamp 136 being provided, if desired, as illustrated for the case of fuse 135. Clearly, this novel arrangement provides a substantial saving in transformer equipment.

A modified open delta arrangement for the transformers is illustrated in FIGURE 4, and is similar to the circuit shown in FIGURE 3 with similar numerals designating similar components. Note that in FIGURE 4, each of the transformers is provided with a respective fuse such as fuses 140 and 141 which are shunted by respective resistors such as resistors 142 and 144 which will reduce fault current to a low value after a fuse operation and keep the voltage drop across the fuse to some predetermined value such as 600 volts, thus permitting the use of 600 volt fuses.

FIGURES 5 through 7 illustrate various manners in which the single phase voltage balancing transformers may be produced. In each of FIGURES 5 through 7, there is illustrated the voltage balancing transformer 64 of FIGURE 2 which extends between diodes 40 and 48.

Referring first to FIGURE 5, I have illustrated therein the transformer 64 as comprising a magnetic core 150 which is mounted directly from the bus bar, as schematically illustrated by the dotted mounting bar 151. The magnetic core 150 then has wound thereon a bifilar winding 152. One end of each of the windings are then connected to stand-off bushings 153 and 154, or other suitable terminals which are suitably insulated from the core 150 and the other end of the windings. These terminals are then connected across rectifier 48. The opposite end of each of the windings are then taken from the body of the coil 152 and connected across diode 40.

The novel transformer of the invention also lends itself to the inexpensive C-core type structure schematically illustrated in FIGURE 6. Thus, in FIGURE 6, the magnetic core of the transformer may be formed of a C-core 160 which has two disc-wound windings 161 and 162 thereon. The winding 161 corresponds to the primary winding of transformer 64, while winding 162 corresponds to the secondary winding of transformer 64 with one terminal of each of the windings 161 and 162 being taken out and connected across the respective diodes 40 and 48.

FIGURE 7 illustrates the manner in which a novel compact arrangement can be formed for the transformers of FIGURE 2. Thus, in FIGURE 7, the transformer 64 is formed of a magnetic core 170 having the two windings 171 and 172. The transformer 65 is then formed of a separate magnetic core 173 which is insulated from core 170 as by a suitable insulation spacer 174 and receives the same winding 172 wound on core 170 which serves as the primary winding for transformer 65. The secondary winding of transformer 65 is then formed of winding 175. Transformer 66 is then formed of the core 176 which receives the winding 175 as its primary winding. Once again core 176 is insulated from core 174 as by an insulation spacer 177. The secondary winding of transformer 66 is then formed of the winding 178 which, in a manner similar to that described, could also serve as the primary winding for the next core forming transformer 67.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. A voltage balancing circuit for a plurality of series connected diodes; said plurality of series connected diodes being connected in series with an A-C source and a load; said voltage balancing circuit including a plurality of single phase transformers having first and second windings; the said first winding of a first of said plurality of transformers being connected to said A-C source; the said second winding of said first transformer electrically connected across at least a first diode of said plurality of series connected diodes; said second winding of said first transformer connected in series with the said first winding of a second transformer of said plurality of transformers; the said second winding of said second transformer electrically connected across at least a second diode of said plurality of series connected diodes; said second winding of said first and second transformers having a phase relation to said A-C source to supply reverse voltage to said first and second diodes when said A-C source supplies reverse voltage to said first and second diodes.

2. The circuit substantially as set forth in claim 1 wherein said A-C source is a source of multiphase power.

3. The circuit substantially as set forth in claim 1 wherein at least a third diode is interposed between said first and second diodes.

4. A voltage balancing circuit for a multiphase rectifier; said multiphase rectifier including at least three strings of a plurality of series connected diodes defining three respective phases, and a multiphase source of A-C power connected between said three strings and a load; said voltage balancing circuit including at least a first and second group of single phase transformers having first and second windings; the said first winding of a first transformer of each of said groups being electrically connected across the ends of first and second pairs of said strings; the said second winding of said first transformer being connected to corresponding junctions between first and second diodes in said first and second pairs of said strings of diodes; said second windings of said first transformers being connected to the said first windings of a respective second transformer in said groups of transformers; the said second windings of said second transformers being connected to corresponding junctions between third and fourth diodes in said first and second pairs of said strings of diodes; said second windings of each of said transformers having a phase relation to said A-C source to supply inverse voltage to any diodes having inverse voltage applied thereto by said A-C source.

5. The circuit substantially as set forth in claim 4 which further includes additional voltage distributing circuit means in parallel with each of said diodes.

6. The circuit substantially as set forth in claim 1 which further includes a resistor and fuse for each of said diodes; each of said resistors and fuses connected in parallel with their said respective diodes.

7. The circuit substantially as set forth in claim 1 which further includes support means mechanically supporting said single phase transformers from conductors extending from said diodes.

References Cited
UNITED STATES PATENTS

| | | | |
|---|---|---|---|
| 2,895,099 | 7/1959 | Dortort | 321—11 |
| 3,098,963 | 7/1963 | Michaelis | 321—11 |
| 3,170,106 | 2/1965 | Rosenstein | 321—25 |
| 3,229,187 | 1/1966 | Jensen | 321—27 X |

JOHN F. COUCH, *Primary Examiner.*
G. GOLDBERG, *Assistant Examiner.*

UNITED STATES PATENT OFFICE
CERTIFICATE OF CORRECTION

Patent No. 3,334,289                                           August 1, 1967

Walter V. Chumakov

It is hereby certified that error appears in the above numbered patent requiring correction and that the said Letters Patent should read as corrected below.

In the drawings, Fig. 2, a shorting conductor should not connect the leads of transformer 76 bottom winding nor should it connect transformer 77 upper winding. Instead, a conductor should extend from the midpoint of the conductor connecting diode 53 and diode 54 to the midpoint of the conductor connecting the left-hand terminal of transformer 76 bottom winding to the left-hand terminal of transformer 77 upper winding. Also, a conductor should extend from the midpoint of the conductor connecting diode 61 and diode 62 to the midpoint of the conductor connecting the right-hand terminal of transformer 76 bottom winding to the right-hand terminal of transformer 77 upper winding. In Fig. 2b, a connection point should be shown connecting the midpoint of the conductor connecting diode 51 and 52 diode to the midpoint of the conductor connecting the right-hand terminal of transformer 67 bottom winding to the right-hand terminal of transformer 69 upper winding.

Signed and sealed this 10th day of September 1968.

(SEAL)
Attest:

EDWARD M. FLETCHER, JR.                              EDWARD J. BRENNER
Attesting Officer                                             Commissioner of Patents